(12) United States Patent
Kodama

(10) Patent No.: US 9,995,266 B2
(45) Date of Patent: Jun. 12, 2018

(54) CYLINDER INJECTION INTERNAL COMBUSTION ENGINE

(71) Applicant: TOYOTA JIDOSHA KABUSHIKI KAISHA, Aichi-ken, Toyota-shi (JP)

(72) Inventor: Kohei Kodama, Toyota (JP)

(73) Assignee: TOYOTA JIDOSHA KABUSHIKI KAISHA, Toyota-ken, Aichi-ken (JP)

(*) Notice: Subject to any disclaimer, the term of this patent is extended or adjusted under 35 U.S.C. 154(b) by 0 days. days.

(21) Appl. No.: 15/313,795

(22) PCT Filed: May 26, 2015

(86) PCT No.: PCT/IB2015/000741
§ 371 (c)(1),
(2) Date: Nov. 23, 2016

(87) PCT Pub. No.: WO2015/181608
PCT Pub. Date: Dec. 3, 2015

(65) Prior Publication Data
US 2017/0101975 A1    Apr. 13, 2017

(30) Foreign Application Priority Data

May 30, 2014    (JP) .................................. 2014-113521

(51) Int. Cl.
*F02F 7/00* (2006.01)
*F02P 5/152* (2006.01)
(Continued)

(52) U.S. Cl.
CPC ............ *F02P 5/152* (2013.01); *F02B 17/005* (2013.01); *F02B 23/104* (2013.01);
(Continued)

(58) Field of Classification Search
CPC ... F02B 2075/025; F02B 75/22; F02F 7/0007; F02F 7/0053; F02F 7/0073
(Continued)

(56) References Cited

U.S. PATENT DOCUMENTS

| | | | |
|---|---|---|---|
| 5,762,042 A | 6/1998 | Yoshikawa et al. | |
| 5,865,153 A | 2/1999 | Matsumoto | |
| 6,076,492 A * | 6/2000 | Takahashi | F01L 1/02 123/193.3 |
| 6,269,797 B1 * | 8/2001 | Uchida | F02F 1/108 123/468 |
| 2002/0117126 A1 | 8/2002 | Kaneko | |

(Continued)

FOREIGN PATENT DOCUMENTS

| | | |
|---|---|---|
| EP | 0982481 A2 | 3/2000 |
| EP | 1088974 A1 | 4/2001 |

(Continued)

*Primary Examiner* — John Kwon
(74) *Attorney, Agent, or Firm* — Sughrue Mion, PLLC

(57) ABSTRACT

A cylinder head includes: a cylinder head body; multiple fuel ports extending to cylinders from a sidewall surface of the cylinder head body, the sidewall surface being located on one side of a longitudinal axis, on which intake ports are disposed; multiple injection valve attachment bosses projecting from the sidewall surface, surrounding openings of the fuel ports, and adapted to attach cylinder fuel injection valves to the fuel ports; and multiple projections projecting from the sidewall surface and disposed adjacent to the corresponding injection valve attachment bosses. A cylinder block includes: a cylinder block body; and a sensor attachment boss projecting from a sidewall surface of the cylinder block body, the sidewall surface being located on the one side of the longitudinal axis, on which the sidewall surface of the cylinder head body is located. The sensor attachment boss is adapted to attach a knock sensor to the cylinder block.

13 Claims, 12 Drawing Sheets

(51) Int. Cl.
*F02F 1/24* (2006.01)
*F02M 61/14* (2006.01)
*F02B 23/10* (2006.01)
*F02B 77/08* (2006.01)
*F02B 17/00* (2006.01)
*F02D 35/02* (2006.01)
*F02M 61/04* (2006.01)
*F02P 13/00* (2006.01)

(52) U.S. Cl.
CPC .......... *F02B 77/085* (2013.01); *F02D 35/027* (2013.01); *F02F 1/242* (2013.01); *F02M 61/04* (2013.01); *F02M 61/14* (2013.01); *F02P 13/00* (2013.01); *Y02T 10/125* (2013.01)

(58) Field of Classification Search
USPC ............................. 123/195 R, 195 C, 195 H
See application file for complete search history.

(56) References Cited

U.S. PATENT DOCUMENTS

| | | | |
|---|---|---|---|
| 2003/0106503 A1* | 6/2003 | Doers | F01P 3/16 123/41.82 R |
| 2004/0007212 A1* | 1/2004 | Kato | F02B 61/045 123/494 |
| 2010/0252357 A1* | 10/2010 | Fukami | F02B 77/13 181/204 |
| 2011/0114056 A1 | 5/2011 | Abe et al. | |

FOREIGN PATENT DOCUMENTS

| | | |
|---|---|---|
| JP | 05-079901 A | 3/1993 |
| JP | 2002-256911 A | 9/2002 |
| JP | 2007-032278 A | 2/2007 |
| JP | 2009-235904 A | 10/2009 |
| JP | 2011-106385 A | 6/2011 |

\* cited by examiner

CYLINDER INJECTION INTERNAL COMBUSTION ENGINE

BACKGROUND OF THE INVENTION

1. Field of the Invention

The invention relates to a cylinder injection internal combustion engine.

2. Description of Related Art

There is a known cylinder injection internal combustion engine that includes an engine body including a cylinder block and a cylinder head fixed on the top surface of the cylinder block. The engine body includes a plurality of cylinders aligned along the longitudinal axis of the engine body. The cylinder head includes a plurality of fuel ports extending to the corresponding cylinders from one sidewall surface of the cylinder head. The one sidewall surface of the cylinder head is located on one side of the longitudinal axis of the engine body, on which the intake ports are disposed. Cylinder fuel injection valves are attached to the fuel ports, and a knock sensor is attached to one sidewall surface of the cylinder block. The one sidewall surface of the cylinder block is located on the one side of the longitudinal axis of the engine body, on which the one sidewall of the cylinder head is located. Refer to Japanese Patent Application Publication No. 05-079901 (JP 05-079901 A).

SUMMARY OF THE INVENTION

When knocking occurs, a vibration of a specific frequency is generated. When the vibration reaches a knock sensor after propagating through a cylinder head and a cylinder block, the knock sensor detects the occurrence of knocking.

However, in the internal combustion engine described in JP 05-079901 A, the fuel ports extend through the cylinder head and thus the rigidity of the cylinder head in JP 05-079901 A is lower than that of a cylinder head that is not provided with fuel ports. This may make it harder for the vibration indicating the occurrence of knocking to reach the knock sensor, or may increase the noise detected by the knock sensor. In either case, the knock sensor may fail to accurately detect the occurrence of knocking.

A cylinder injection internal combustion engine according to an aspect of the invention is provided. The cylinder injection internal combustion engine includes an engine body. The engine body includes a cylinder block and a cylinder head. The cylinder head is fixed on the top surface of the cylinder block. The engine body includes a plurality of cylinders aligned along the longitudinal axis of the engine body. The cylinder head includes a cylinder head body, a plurality of fuel ports, a plurality of injection valve attachment bosses, and at least one projection. The fuel ports extend to the corresponding cylinders from a sidewall surface of the cylinder head body. The sidewall surface of the cylinder head body is located on one side of the longitudinal axis, on which intake ports are disposed. The injection valve attachment bosses project from the sidewall surface of the cylinder head body and surround openings of the corresponding fuel ports. The injection valve attachment bosses are adapted to attach cylinder fuel injection valves to the respective fuel ports. The at least one projection projects from the sidewall surface of the cylinder head body, and the at least one projection is disposed adjacent to the corresponding injection valve attachment boss. The cylinder block includes a cylinder block body and a sensor attachment boss. The sensor attachment boss projects from a sidewall surface of the cylinder block body. The sidewall surface of the cylinder block body is located on the one side of the longitudinal axis, on which the sidewall surface of the cylinder head body is located. The sensor attachment boss is adapted to attach a knock sensor to the cylinder block.

A cylinder injection internal combustion engine according to another aspect of the invention is provided. The cylinder injection internal combustion engine includes an engine body. The engine body includes a cylinder block and a cylinder head. The cylinder head is fixed on the top surface of the cylinder block. The engine body includes a plurality of cylinders aligned along the longitudinal axis of the engine body. The cylinder head includes a cylinder head body, a plurality of fuel ports, a plurality of injection valve attachment bosses, and at least one coupling portion. The fuel ports extend to the corresponding cylinders from a sidewall surface of the cylinder head body. The sidewall surface of the cylinder head body is located on one side of the longitudinal axis, on which intake ports are disposed. The injection valve attachment bosses project from the sidewall surface of the cylinder head body and surround openings of the corresponding fuel ports. The injection valve attachment bosses are adapted to attach cylinder fuel injection valves to the respective fuel ports. The at least one coupling portion projects from the sidewall surface of the cylinder head body. The at least one coupling portion couples the corresponding injection valve attachment boss to a lower deck of the cylinder head. The cylinder block includes a cylinder block body and a sensor attachment boss. The sensor attachment boss projects from a sidewall surface of the cylinder block body. The sidewall surface of the cylinder block body is located on the one side of the longitudinal axis, on which the sidewall surface of the cylinder head body is located. The sensor attachment boss is adapted to attach a knock sensor to the cylinder block.

In the cylinder injection internal combustion engine, the occurrence of knocking is detected accurately.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
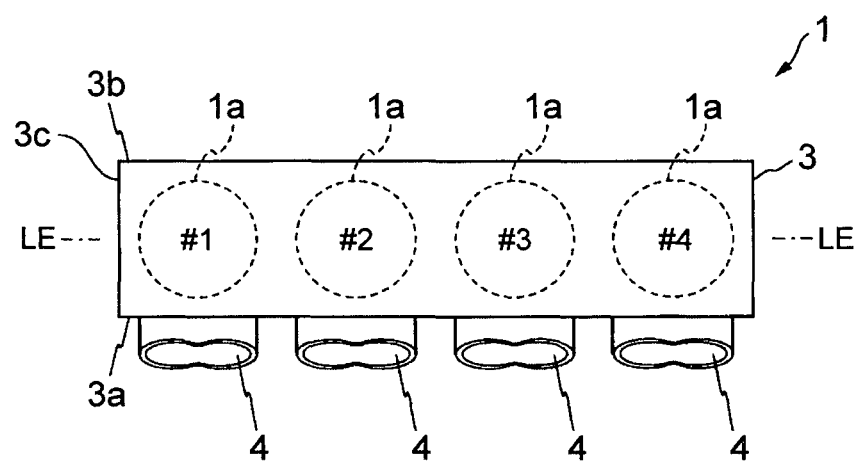
FIG. 1 is a schematic top view of an engine body.
Figure 2:
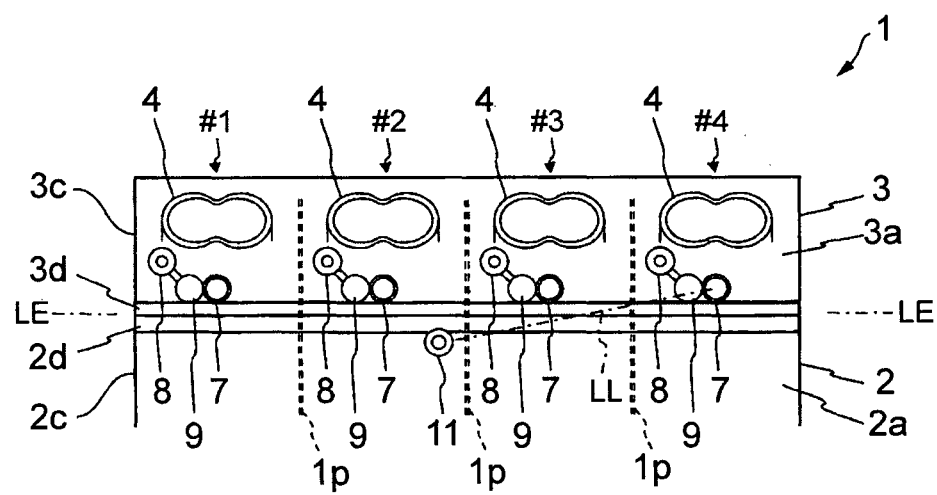
FIG. 2 is a schematic side view of the engine body.
Figure 3:
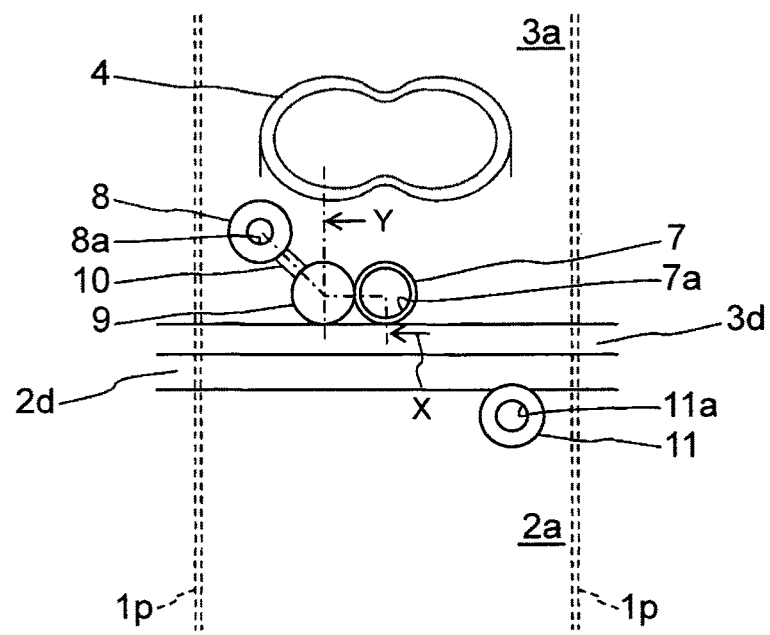
FIG. 3 is a partially-enlarged schematic side view of the engine body.
Figure 4:
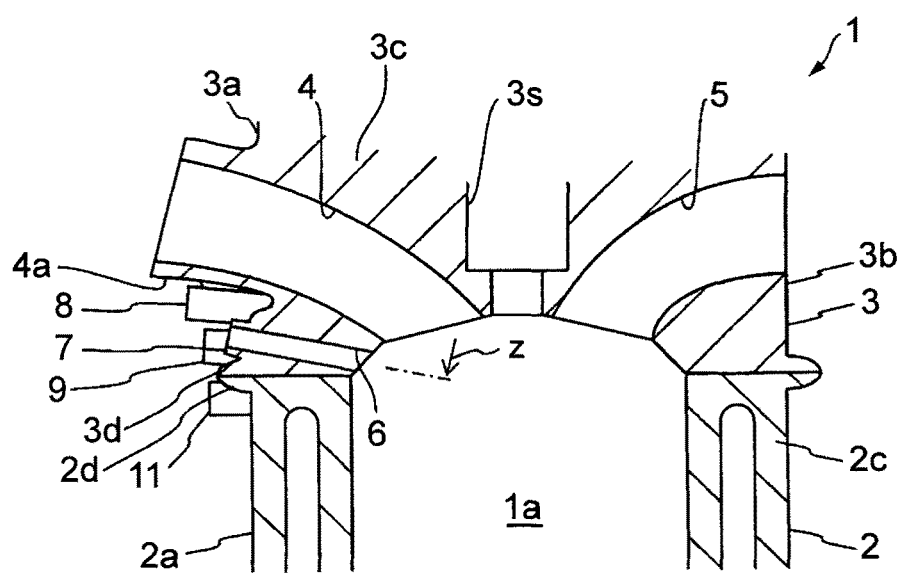
FIG. 4 is a schematic vertical sectional view of the engine body.
Figure 5:
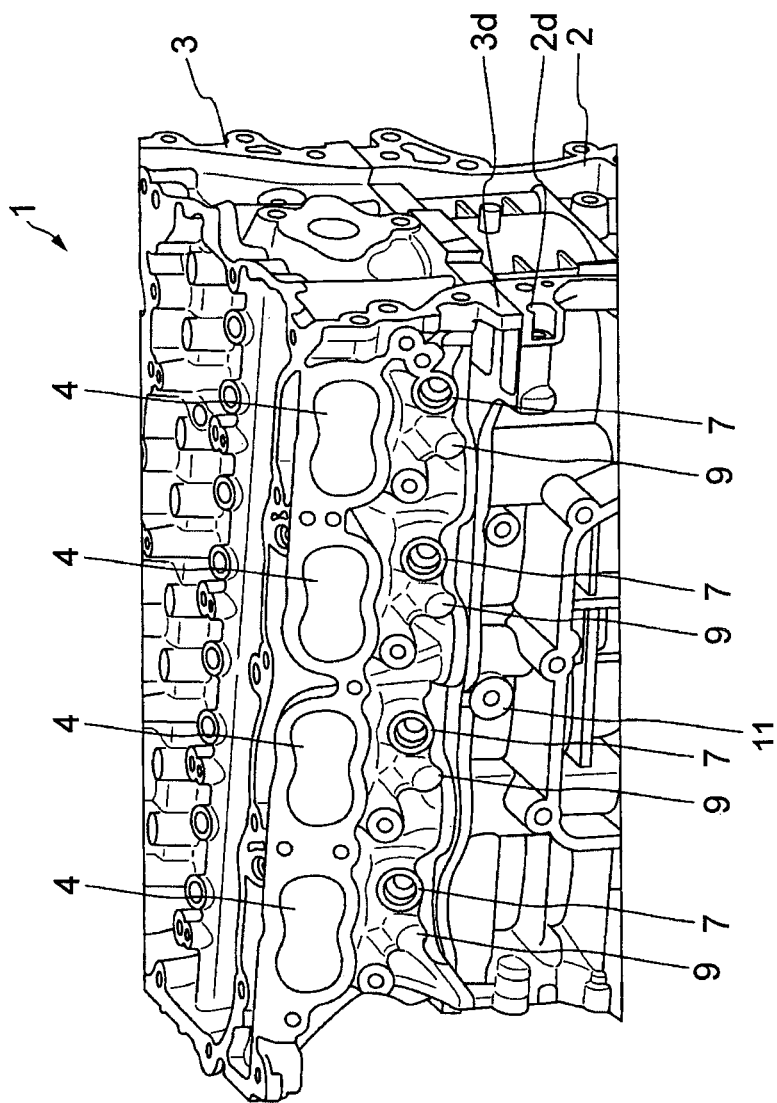
FIG. 5 is a perspective view of the engine body.

Hereinafter, example embodiments of the invention will be described with reference to the accompanying drawings. As illustrated in FIG. 1 to FIG. 5, an engine body 1 of a spark-ignition cylinder-injection internal combustion engine includes a cylinder block 2 and a cylinder head 3 fixed on the top surface of the cylinder block 2. The cylinder block 2 and the cylinder head 3 are made of, for example, an aluminum alloy. The engine body 1 includes a plurality of cylinders 1a aligned along a longitudinal axis LE of the engine body 1. In an embodiment of the invention illustrated in FIG. 1 to FIG. 5, the engine body 1 includes a first cylinder #1, a second cylinder #2, a third cylinder #3 and a fourth cylinder #4. As illustrated in FIG. 2 and FIG. 3, lubricant passages 1p extend inside the cylinder block 2 and the cylinder head 3. The cylinder head 3 has a plurality of ignition plug receiving holes 3s, as illustrated in FIG. 4. Each ignition plug receiving hole 3s is adapted to receive an ignition plug.

The top portion of the cylinder block 2 includes an upper deck 2d that extends as a flat surface. The top surface of the upper deck 2d constitutes the top surface of the cylinder block 2. The bottom portion of the cylinder head 3 includes a lower deck 3d that extends as a flat surface. The bottom surface of the lower deck 3d constitutes the bottom surface of the cylinder head 3. The bottom surface of the cylinder head 3 is placed on the top surface of the cylinder block 2. Thus, the cylinder block 2 and the cylinder head 3 are fixed to each other.

The cylinder head 3 includes a cylinder head body 3c. The cylinder head body 3c is provided with a plurality of intake ports 4 and a plurality of exhaust ports 5. The intake ports 4 extend inside the cylinder head body 3c from a sidewall surface 3a of the cylinder head body 3c to the corresponding cylinders 1a. The sidewall surface 3a of the cylinder head body 3c is located on one side of the longitudinal axis LE. The exhaust ports 5 extend inside the cylinder head body 3c from a sidewall surface 3b of the cylinder head body 3c to the corresponding cylinders 1a. The sidewall surface 3b of the cylinder head body 3c is located on the other side of the longitudinal axis LE. As illustrated in FIG. 4, outer wall surfaces 4a of the intake ports 4 project outward from the sidewall surface 3a of the cylinder head body 3c, that is, project in a direction away from the cylinder head body 3c.

The cylinder head body 3c includes a plurality of fuel ports 6 extending inside the cylinder head body 3c from the sidewall surface 3a to the corresponding cylinders 1a. The sidewall surface 3a, from which the fuel ports 6 extend, is located on the one side of the longitudinal axis LE, on which the intake ports 4 are disposed. In the embodiment illustrated in FIG. 1 to FIG. 5, the fuel ports 6 are disposed between the corresponding intake ports 4 and the lower deck 3d of the cylinder head 3.

The cylinder head body 3c further includes a plurality of injection valve attachment bosses 7 projecting outward from the sidewall surface 3a of the cylinder head body 3c, and the injection valve attachment bosses 7 surround the openings of the corresponding fuel ports 6. In other words, the fuel ports 6 are provided with the injection valve attachment bosses 7. The injection valve attachment bosses 7 have, boss holes 7a that communicate with the corresponding fuel ports 6. Each boss hole 7a is adapted to receive a cylinder fuel injection valve. That is, the injection valve attachment bosses 7 are adapted to attach the cylinder fuel injection valves to the corresponding fuel ports 6 and thereby to the cylinder head 3. Each injection valve attachment boss 7 has a cylindrical shape.

The cylinder head body 3c further includes a plurality of holder attachment bosses 8 disposed between the corresponding intake ports 4 and the lower deck 3d. The holder attachment bosses 8 project outward from the sidewall surface 3a of the cylinder head body 3c. The holder attachment bosses 8 have boss holes 8a. Each boss hole 8a is adapted to receive a holder (not illustrated) that holds, for example, a fuel pipe (not illustrated) through which fuel is supplied to the fuel injection valve. That is, the holder attachment bosses 8 are adapted to attach the holders to the cylinder head 3.

The cylinder head body 3c further includes a plurality of projections 9 disposed adjacent to all the corresponding injection valve attachment bosses 7. The projections 9 project outward from the sidewall surface 3a of the cylinder head body 3c. Each projection 9 has a columnar shape. In other, embodiments (not illustrated) of the invention, the projections 9 are in any one of various shapes such as a conical shape and a truncated conical shape.

It can be said that each cylinder 1a is provided with one intake port 4 and one injection valve attachment boss 7. Thus, in the embodiment illustrated in FIG. 1 to FIG. 5, each cylinder 1a is provided with one projection 9, and the injection valve attachment boss 7 and the projection 9 are disposed adjacent to each other at each cylinder 1a.

Figure 6A:
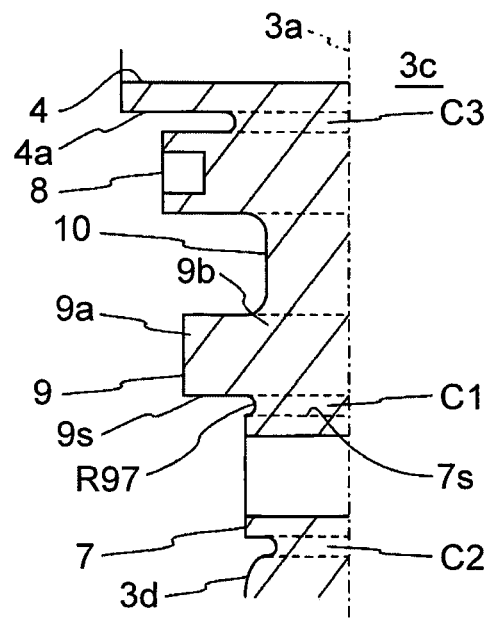
FIG. 6A is a partial sectional view of a cylinder head taken along a line X in FIG. 3.
Figure 6B:
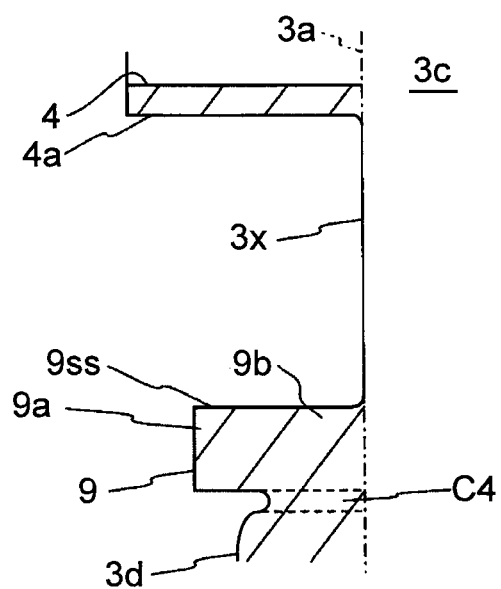
FIG. 6B is a partial sectional view of the cylinder head taken along a line Y in FIG. 3.

FIG. 6A is a partial sectional view of the cylinder head 3 taken along a line X in FIG. 3. FIG. 6B is a partial sectional view of the cylinder head 3 taken along a line Y in FIG. 3. As illustrated in FIG. 6A, the injection valve attachment boss 7 is coupled to the lower deck 3d. More specifically, a lateral surface portion of the lateral surface of the injection valve attachment boss 7, the lateral surface portion facing the lower deck 3d, is coupled to the lower deck 3d. Further, the injection valve attachment boss 7 is coupled to the lateral surface of the adjacent projection 9. More specifically, a lateral surface portion of the lateral surface of the injection valve attachment boss 7, the lateral surface portion facing the adjacent projection 9, is coupled to the adjacent projection 9. As illustrated in FIG. 6A, the projection 9 is coupled to the injection valve attachment boss 7. More specifically, a lateral surface portion of the lateral surface of the projection 9, the lateral surface portion facing the injection valve attachment boss 7, is coupled to the injection valve attachment boss 7. Further, the projection 9 is coupled to the lateral surface of the holder attachment boss 8 via a wall portion 10 that projects outward from the sidewall surface 3a of the cylinder head body 3c. More specifically, a lateral surface portion of the lateral surface of the projection 9, the lateral surface portion facing the holder attachment boss 8, is coupled to the lateral surface of the holder attachment boss 8 via the wall portion 10. Further, as illustrated in FIG. 6B, the projection 9 is coupled to the lower deck 3d. More specifically, a lateral surface portion of the lateral surface of the projection 9, the lateral surface portion facing the lower deck 3d, is coupled to the lower deck 3d. Further, the holder attachment boss 8 is coupled to the outer wall surface 4a of the intake port 4. More specifically, a lateral surface portion of the lateral surface of the holder attachment boss 8, the lateral surface portion facing the intake port 4, is coupled to the outer wall surface 4a of the intake port 4. Thus, the projection 9 is coupled to the outer wall surface 4a of the intake port 4 via the wall portion 10 and the holder attachment boss 8.

Figure 7A:
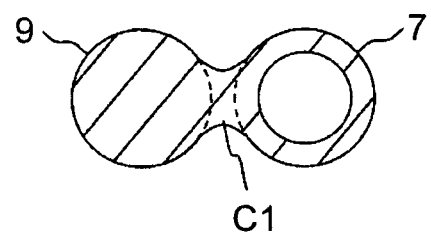
FIG. 7A is a partial sectional view illustrating a manner of coupling an injection valve attachment boss and a projection to each other according to an embodiment of the invention.

Manners of coupling the injection valve attachment boss 7 and the projection 9 to each other will be described below in more detail. As illustrated in FIG. 6A and FIG. 7A, the injection valve attachment boss 7 and the projection 9 are coupled to each other via a connection portion C1. As illustrated in FIG. 6A, the injection valve attachment boss 7 and the lower deck 3d are coupled to each other via a connection portion C2, and the holder attachment boss 8 and the intake port 4 are coupled to each other via a connection portion C3. As illustrated in FIG. 6B, the projection 9 and the lower deck 3d are coupled to each other via a connection portion C4. In the present embodiment, the connection portions C1, C2, C3, C4 all project outward from the sidewall surface 3a of the cylinder head body 3c.

Figure 7B:
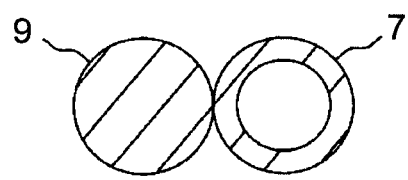
FIG. 7B is a partial sectional view illustrating a manner of coupling an injection valve attachment boss and a projection to each other according to another embodiment of the invention.
Figure 7C:
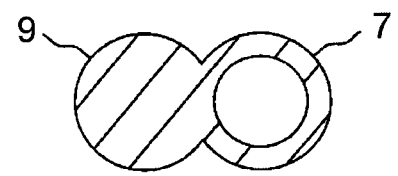
FIG. 7C is a partial sectional view illustrating a manner of coupling an injection valve attachment boss and a projection to each other according to another embodiment of the invention.

FIG. 7B and FIG. 7C illustrate manners of coupling the injection valve attachment boss 7 and the projection 9 to each other according to other embodiments of the invention. In the embodiment illustrated in FIG. 7B, the injection valve attachment boss 7 and the projection 9 are coupled to each other by bringing the lateral surface of the injection valve attachment boss 7 and the lateral surface of the projection 9 into contact with each other. In the embodiment illustrated in FIG. 7C, the injection valve attachment boss 7 and the projection 9 are coupled to each other by partially integrating the injection valve attachment boss 7 and the projection 9 with each other. That is, in the embodiments illustrated in FIG. 7B and FIG. 7C, the injection valve attachment boss 7 and the projection 9 are coupled to each other without providing the connection portion C1. The coupling between the injection valve attachment boss 7 and the lower deck 3d, the coupling between the holder attachment boss 8 and the intake port 4, and the coupling between the projection 9 and the lower deck 3d may be made in manners similar to those described above.

As described above, the injection valve attachment boss 7 is coupled to the lower deck 3d via the projection 9. In view of this, the projection 9 may be regarded as a coupling portion that couples the injection valve attachment boss 7 to the lower deck 3d and that projects outward from the sidewall surface 3a of the cylinder head body 3c. That is, the injection valve attachment boss 7 is coupled to the lower deck 3d via the coupling portion. Note that, the coupling portion is different from the connection portion C2. Thus, it can be said that the injection valve attachment boss 7 is coupled, via the connection portion C2, to the lower deck 3d, at the lateral surface portion of the lateral surface of the injection valve attachment boss 7, which faces the lower deck 3d, while the injection valve attachment boss 7 is coupled to the lower deck 3d via the coupling portion.

Referring to FIG. 6A and FIG. 6B, the projection 9 projects further outward than the adjacent injection valve attachment boss 7, wall portion 10, and lower deck 3d. That is, the lateral surface of a distal end portion 9a of the projection 9 is not coupled to any other portion of the cylinder head 3 and is not coupled to any element other than the cylinder head 3, over the entire circumference of the lateral surface of the distal end portion 9a. Thus, the distal end portion 9a may be regarded as a free end portion. In contrast to this, the lateral surface portion of a proximal end portion 9b of the projection 9 is coupled to the injection valve attachment boss 7, the wall portion 10, and the lower deck 3d. Thus, the proximal end portion 9b may be regarded as a fixed end portion.

Figure 8A:
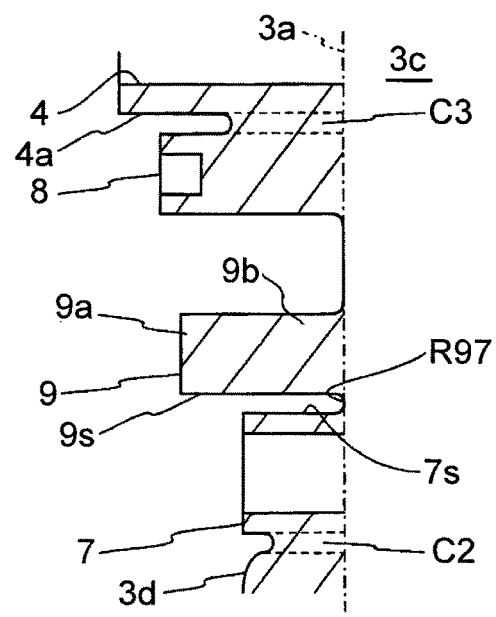
FIG. 8A is a partial sectional view of a cylinder head according to another embodiment of the invention, illustrated in a manner similar to that in FIG. 6A.
Figure 8B:
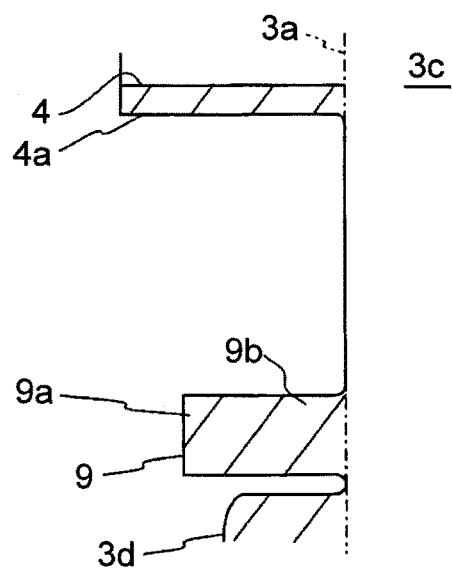
FIG. 8B is a partial sectional view of the cylinder head according to the other embodiment, illustrated in a manner similar to that in FIG. 6B.
Figure 9:
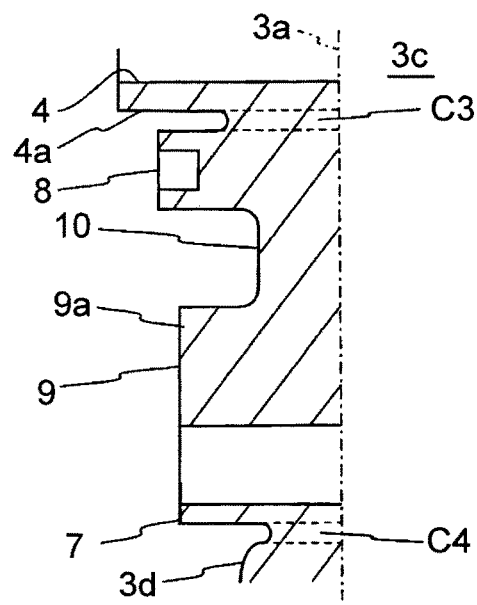
FIG. 9 is a partial sectional view of a cylinder head according to another embodiment of the invention, illustrated in a manner similar to that in FIG. 6A.

FIG. 8A, FIG. 8B and FIG. 9 illustrate still other embodiments. In the embodiment illustrated in FIG. 8A and FIG. 8B, the lateral surface of the projection 9 is not coupled to the lateral surface of the injection valve attachment boss 7. Further, the lateral surface of the projection 9 is not coupled to the lower deck 3d. Further, no wall portion 10 is provided. Thus, the lateral surface of the projection 9 is not coupled to the lateral surface of the holder attachment boss 8. That is, in the invention, it does not matter whether or not the projection 9 is coupled to the injection valve attachment boss 7, it does not matter whether or not the projection 9 is coupled to the lower deck 3d, and it does not matter whether or not the projection 9 is coupled to the holder attachment boss 8.

In contrast to this, in the embodiment illustrated in FIG. 9, the lateral surface of the distal end portion 9a of the projection 9 is coupled to, for example, the lateral surface of the injection valve attachment boss 7. In this case, the distal end portion 9a does not constitute a free end portion, and thus, the projection 9 has no free end portion.

The sidewall surface 3a of the cylinder head body 3c is illustrated as a flat surface in FIG. 6A, FIG. 6B, FIG. 8A, FIG. 8B, and FIG. 9. However, the shape of the sidewall surface 3a of the cylinder head body 3c depends on the contour of the cylinder head body 3c. Therefore, the sidewall surface 3a of the cylinder head body 3c is not actually a flat surface in some cases.

The projection 9 and the injection valve attachment boss 7 will be described in detail below. In the embodiment illustrated in FIG. 8A and FIG. 8B, the projection 9 and the injection valve attachment boss 7 are not coupled to each other. In this case, a lateral surface portion 9s of the lateral surface of the projection 9, the lateral surface portion 9s facing the injection valve attachment boss 7, and a lateral surface portion 7s of the lateral surface of the injection valve attachment boss 7, the lateral surface portion 7s facing the projection 9, are both entirely exposed from the distal ends thereof (i.e., the outer edges thereof) to the sidewall surface 3a of the cylinder head body 3c. In contrast to this, in the embodiment illustrated in FIG. 6A and FIG. 6B, the projection 9 and the injection valve attachment boss 7 are coupled to each other. In this case, the lateral surface portion 9s of the projection 9 and the lateral surface portion 7s of the injection valve attachment boss 7 each have a portion covered with the connection portion C1 and the remaining portion exposed, in a direction from the distal ends thereof to the sidewall surface 3a of the cylinder head body 3c. In each of the embodiments illustrated in FIG. 7B and FIG. 7C, the lateral surface portion 9s of the projection 9 is covered with the lateral surface portion 7s of the injection valve attachment boss 7, and the lateral surface portion 7s of the injection valve attachment boss 7 is covered with the lateral surface portion 9s of the projection 9. In the embodiment illustrated in FIG. 9, the lateral surface portion 9s of the projection 9 is entirely covered with the lateral surface portion 7s of the injection valve attachment boss 7, and the lateral surface portion 7s of the injection valve attachment boss 7 is entirely covered with the lateral surface portion 9s of the projection 9. Thus, when the lateral surface portion 9s of the projection 9 is at least partially covered with the lateral surface portion 7s of the injection valve attachment boss 7 and the lateral surface portion 7s of the injection valve attachment boss 7 is at least partially covered with the lateral surface portion 9s of the projection 9, the projection 9 and the injection valve attachment boss 7 are coupled to each other.

In the embodiment illustrated in FIG. 8A and FIG. 8B in which the projection 9 and the injection valve attachment boss 7 are not coupled to each other, a boundary region R97 between the projection 9 and the injection valve attachment boss 7 is in the form of a surface that is flush with the sidewall surface 3a of the cylinder head body 3c. In contrast to this, in the embodiment illustrated in FIG. 6A and FIG. 6B in which the projection 9 and the injection valve attachment boss 7 are coupled to each other, the boundary region R97 is in the form of a surface that is not flush with the sidewall surface 3a of the cylinder head body 3c, and the boundary region R97 is located outward of the sidewall surface 3a. In the embodiment illustrated in FIG. 7B, the boundary region R97 is in the form of a point. In the embodiment illustrated in FIG. 7C, the boundary region R97 is in the form of a line. Thus, it can be said that, when the boundary region R97 is located outward of the sidewall surface 3a, the projection 9 and the injection valve attachment boss 7 are coupled to each other.

In the embodiment illustrated in FIG. 6A and FIG. 6B, a lateral surface portion 9ss of the lateral surface of the projection 9, which faces the intake port 4, extends to the innermost position in a direction toward the sidewall surface 3a of the cylinder head body 3c, among all the lateral surface portions of the lateral surface of the projection 9. That is, the lateral surface portion 9ss of the lateral surface of the projection 9 extends to a position closer to the sidewall surface 3a of the cylinder head body 3c than the other lateral surface portions of the lateral surface of the projection 9. The lateral surface portion 9ss of the projection 9 extends inward from the distal end portion 9a of the projection 9, and is then connected to a wall surface portion 3x of the cylinder head body 3c, as illustrated in FIG. 6B. In this case, the wall surface portion 3x is flush with the sidewall surface 3a of the cylinder head body 3c in the embodiment illustrated in FIG. 6A and FIG. 6B. Thus, in the embodiment illustrated in FIG. 6A and FIG. 6B, a wall surface portion of the cylinder head 3, which is coupled to the lateral surface portion extending to the innermost position in a direction toward the cylinder head body 3c among all the lateral surface portions of the projection 9, is the sidewall surface 3a of the cylinder head body 3c. In other words, when the boundary region R97 between the projection 9 and the injection valve attachment boss 7 is located outward of the wall surface portion 3x, the projection 9 and the injection valve attachment boss 7 are coupled to each other.

The coupling between the projection 9 and the lower deck 3d, the coupling between the projection 9 and the holder attachment boss 8, and the coupling between the injection valve attachment boss 7 and the lower deck 3d may be made in manners similar to those described above.

Figure 10:
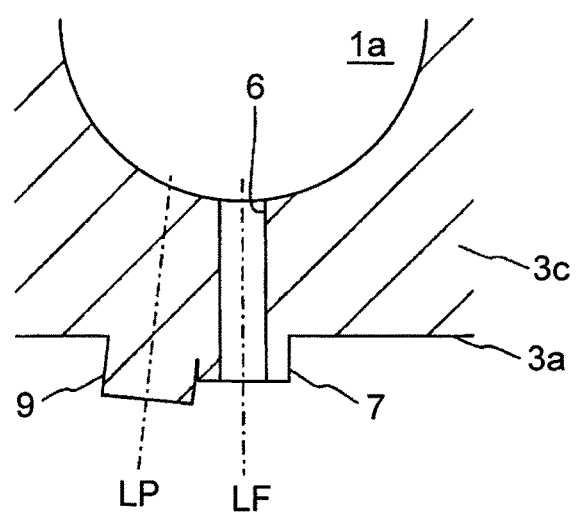
FIG. 10 is a partial sectional view of the cylinder head taken along a line Z in FIG. 4.

FIG. 10 is a partial sectional view of the cylinder head 3 taken along a line Z in FIG. 4. As illustrated in FIG. 10, the projection 9 is solid. The projection 9 projects outward from the sidewall surface 3a of the cylinder head body 3c along a projection axis LP of the projection 9. The fuel port 6 extends along a central axis LF of the fuel port 6. In the embodiment illustrated in FIG. 10, the projection 9 is formed such that the projection axis LP of the projection 9 extends to the cylinder 1a without intersecting with the fuel port 6 or the central axis LF of the fuel port 6. In another embodiment (not illustrated) of the invention, the projection 9 is formed such that the projection axis LP of the projection 9 intersects with the fuel port 6 or the central axis LF of the fuel port 6 before reaching the cylinder 1a. When the projection 9 has, for example, a columnar shape, the projection axis LP coincides with a central axis of the projection 9.

Referring again to FIG. 1 to FIG. 5, the cylinder block 2 includes the cylinder block body 2c. The cylinder block body 2c includes a sensor attachment boss 11 that projects outward from a sidewall surface 2a of the cylinder block body 2c. The sidewall surface 2a of the cylinder block body 2c is located on the one side of the longitudinal axis LE, on which the sidewall surface 3a of the cylinder head body 3c is located. The sensor attachment boss 11 has a boss hole 11a. The boss hole 11a is adapted to receive a knock sensor that detects the occurrence of knocking. That is, the sensor attachment boss 11 is adapted to attach the knock sensor to the cylinder block 2. The lateral surface of the sensor attachment boss 11 is coupled to the upper deck 2d of the cylinder block 2. In another embodiment (not illustrated) of the invention, the lateral surface of the sensor attachment boss 11 is not coupled to the upper deck 2d of the cylinder block 2.

In the embodiment illustrated in FIG. 1 to FIG. 5, the cylinder block 2 includes only one sensor attachment boss 11. The single sensor attachment boss 11 is disposed at substantially the center of the cylinder block 2 in the direction of the longitudinal axis LE. Specifically, the sensor attachment boss 11 is disposed between the second cylinder #2 and the third cylinder #3, at such a position that the sensor attachment boss 11 does not interfere with the lubricant oil passage 1p. In another embodiment (not illustrated) of the invention, the sensor attachment boss 11 is disposed, for example, between the first cylinder #1 and the second cylinder #2, or between the third cylinder #3 and the fourth cylinder #4.

As illustrated particularly in FIG. 2, at each of the first cylinder #1 and the second cylinder #2, the projection 9 is disposed on the opposite side of the injection valve attachment boss 7 from the sensor attachment boss 11. In contrast to this, at each of the third cylinder #3 and the fourth cylinder #4, the projection 9 is disposed on one side of the injection valve attachment boss 7, on which the sensor attachment boss 11 is disposed. That is, the projection 9 at each of the third cylinder #3 and the fourth cylinder #4 and the sensor attachment boss 11 are disposed on the same side with respect to the corresponding injection valve attachment boss 7. Further, as illustrated in FIG. 2, at the fourth cylinder #4, the projection 9 is disposed on a straight line LL that connects the corresponding injection valve attachment boss 7 to the sensor attachment boss 11. At each of the first cylinder #1, the second cylinder #2 and the third cylinder #3, the projection 9 is disposed at a position offset from the straight line that connects the corresponding injection valve attachment boss 7 to the sensor attachment boss 11. In another embodiment (not illustrated) of the invention, at each of all the cylinders, the projection 9 is disposed at a position on the straight line that connects the corresponding injection valve attachment boss 7 to the sensor attachment boss 11. In another embodiment (not illustrated) of the invention, at each of all the cylinders, the projection 9 is disposed at a position offset from the straight line that connects the corresponding injection valve attachment boss 7 to the sensor attachment boss 11.

In the engine body 1 that includes the cylinder head 3 including the projections 9, a knock sensor was attached to the sensor attachment boss 11, and a signal-to-noise (SN ratio) of the knock sensor was detected. As a result, it was confirmed that the SN ratio of the knock sensor was improved by 30% or more as compared with an engine body provided with no projections 9. Thus, when the cylinder head 3 is provided with the projections 9, it is possible to more accurately detect the occurrence of knocking. The reason for this may be as follows.

The provision of the projections 9 improves the rigidity of the cylinder head 3. In this case, providing the projections 9 at positions adjacent to the injection valve attachment bosses 7, which are provided for the fuel ports 6 extending through the cylinder head 3, inhibits reduction in the rigidity of the cylinder head 3 due to formation of the fuel port 6, or improves the rigidity of the cylinder head 3. As a result, a vibration indicating the occurrence of knocking more smoothly reaches the knock sensor, so that the occurrence of knocking is detected more accurately. Furthermore, as described above with reference to FIG. 2, at each of the third cylinder #3 and the fourth cylinder #4, the projection 9 is disposed on the one side of the injection valve attachment boss 7, on which the sensor attachment boss 11 is disposed. Thus, the rigidity of a transmission path of a vibration indicating the occurrence of knocking, which extends from the third cylinder #3 or the fourth cylinder #4 to the knock sensor, is improved. As a result, the occurrence of knocking is detected more accurately. When the temperature of the cylinder head 3 becomes considerably high during the operation of the internal combustion engine, the cylinder head 3 softens to increase the flexibility of the cylinder head 3. Thus, the free end portion 9a of the projection 9 vibrates or deforms easily with respect to the fixed end portion 9b of the projection 9. Thus, when a vibration to be noise reaches the projection 9 to vibrate the free end portion 9a, the vibration to be noise is inhibited from reaching the knock sensor. For whatever reason, it was confirmed that the SN ratio of the knock sensor was actually improved.

FIG. 11 to FIG. 15 illustrate various other embodiments of the invention.

Figure 11:
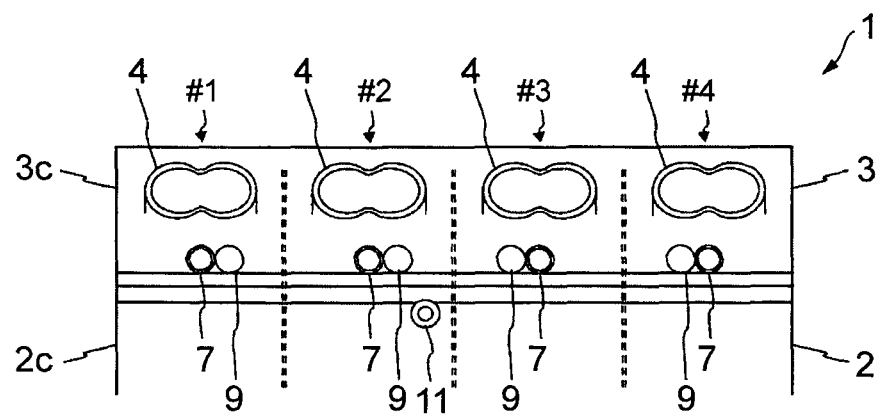
FIG. 11 is a schematic side view of an engine body according to another embodiment of the invention.

In the embodiment illustrated in FIG. 11, each of all the projections 9 is disposed on one side of the corresponding injection valve attachment boss 7, on which the sensor attachment boss 11 is disposed. That is, each of all the projections 9 and the sensor attachment boss 11 are disposed on the same side with respect to the corresponding injection valve attachment boss 7. As a result, at each of all the cylinders, the rigidity of the transmission passage of vibration indicating the occurrence of knocking is improved. Thus, it is possible to more accurately detect the occurrence of knocking.

Figure 12:
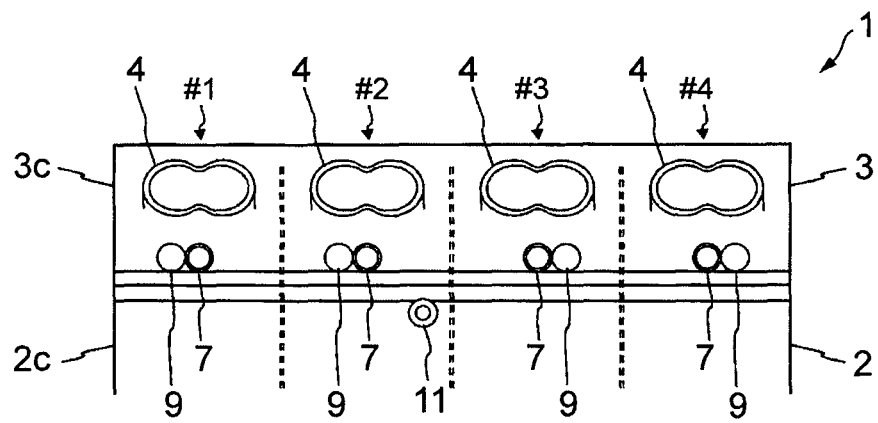
FIG. 12 is a schematic side view of an engine body according to another embodiment of the invention.

In the embodiment illustrated in FIG. 12, each of all the projections 9 is disposed on the opposite side of the corresponding injection valve attachment boss 7 from the sensor attachment boss 11. In the case as well, the rigidity of the cylinder head 3 is improved. Thus, it is possible to more accurately detect the occurrence of knocking.

Figure 13:
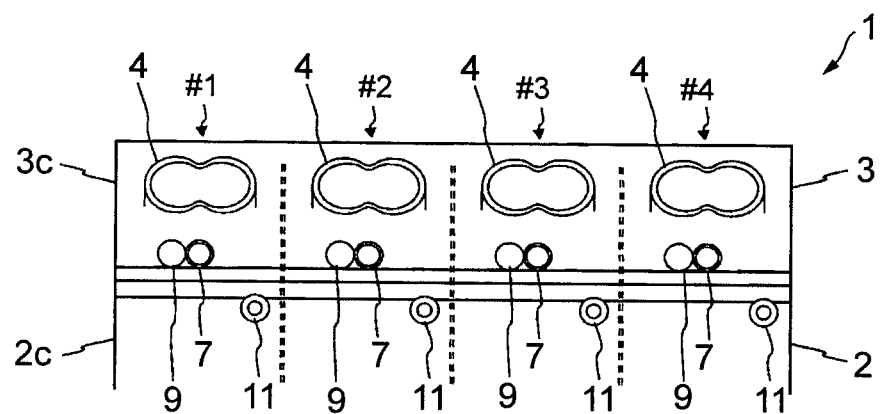
FIG. 13 is a schematic side view of an engine body according to another embodiment of the invention.

In the embodiment illustrated in FIG. 13, all the cylinders 1a are provided with the sensor attachment bosses 11. Thus, it is possible to more accurately detect the occurrence of knocking. When the embodiment illustrated in FIG. 2 and the embodiment illustrated in FIG. 13 are collectively described, at least one of the cylinders 1a is provided with the sensor attachment boss 11.

Figure 14:
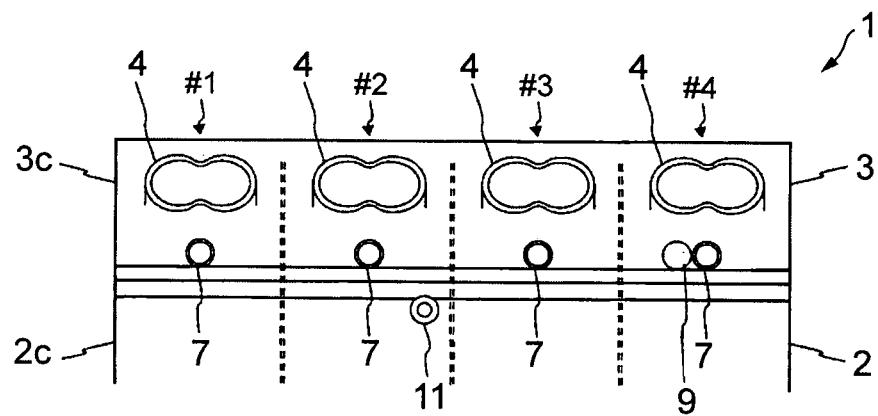
FIG. 14 is a schematic side view of an engine body according to another embodiment of the invention.

In the embodiment illustrated in FIG. 14, only one projection 9 is provided adjacent to the injection valve attachment boss 7 of, for example, the fourth cylinder #4 which is farthest from the sensor attachment boss 11 among all the cylinders #1 to #4. Thus, knocking at the fourth cylinder #4, which is farthest from the knock sensor among all the cylinders #1 to #4, is detected more accurately. In another embodiment (not illustrated) of the invention, two or three projections 9 are provided. When these embodiments are collectively described, the cylinder head 3 includes at least one projection 9 that projects outward from the sidewall surface 3a of the cylinder head body 3c and that is located adjacent to the corresponding injection valve attachment boss 7.

Figure 15:
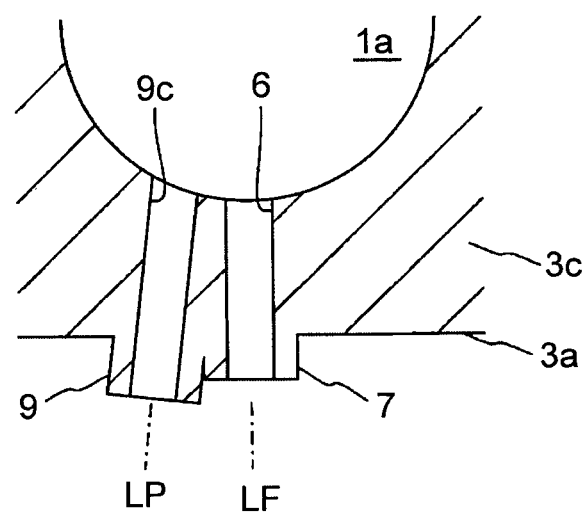
FIG. 15 is a partial sectional view of a cylinder head according to another embodiment of the invention, illustrated in a manner similar to that in FIG. 10.

In the embodiment illustrated in FIG. 15, a through-hole 9c extends to the corresponding cylinder 1a through the projection 9. In this case, the projection axis LP of the projection 9 intersects with neither the fuel port 6 nor the central axis LF of the fuel port 6, and thus the through-hole 9c extends to the cylinder 1a without intersecting with the fuel port 6. The through-hole 9c is adapted to receive an in-cylinder pressure sensor (not illustrated). That is, in the embodiment illustrated in FIG. 15, it is possible to detect an in-cylinder pressure while accurately detecting the occurrence of knocking.

Figure 16:
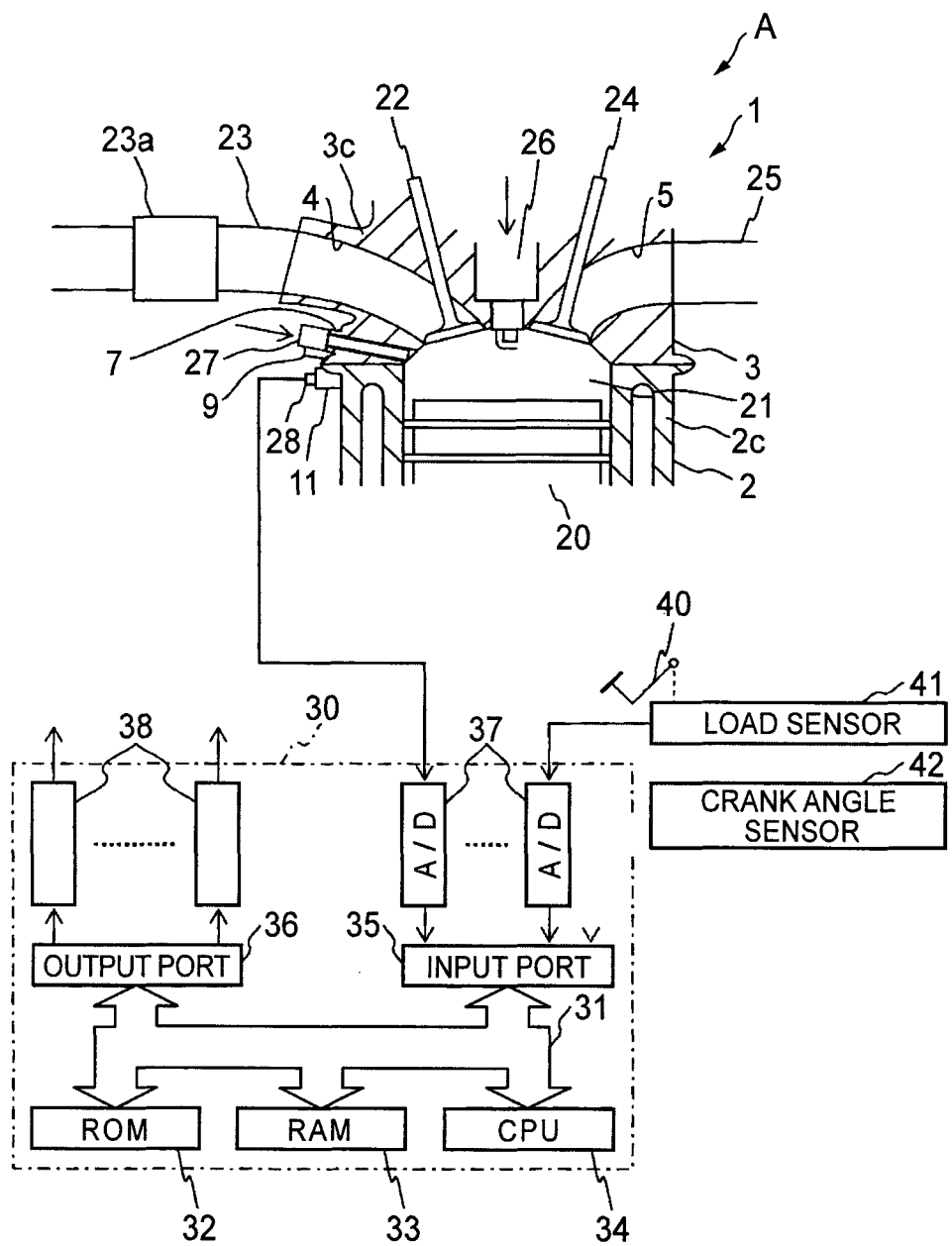
FIG. 16 is an overall view of a cylinder injection internal combustion engine.

FIG. 16 is an overall view of a cylinder injection internal combustion engine A including the engine body 1 according to any one of the above-described embodiments. As illustrated in FIG. 16, the cylinder injection internal combustion engine A includes a piston 20, a combustion chamber 21, an intake valve 22 disposed at an outlet of the intake port 4, an intake passage 23 connected to an inlet of the intake port 4, an exhaust valve 24 disposed at an inlet of the exhaust port 5, an exhaust passage 25 connected to an outlet of the exhaust port 5, an ignition plug 26 received by the ignition plug receiving hole 3s, a cylinder fuel injection valve 27, which is attached to the fuel port 6 via the injection valve attachment boss 7 and which injects fuel directly into the corresponding cylinder 1a, and a knock sensor 28, which is attached to the sensor attachment boss 11 and which detects the occurrence of knocking. A supercharger 23a, which is driven by the engine or driven by exhaust gas, is disposed in the intake passage 23.

An electronic control unit 30 is a digital computer, and includes a read only memory (ROM) 32, a random access memory (RAM) 33, a microprocessor (CPU) 34, an input port 35 and an output port 36, which are connected to one another via a bidirectional bus 31. An output signal from the knock sensor 28 is input into the input port 35 via a corresponding analog-to-digital (AD) converter 37. Further, an accelerator pedal 40 is connected to a load sensor 41 that generates an output voltage proportional to a depression amount of the accelerator pedal 40. The output voltage from the load sensor 41 is input into the input port 35 via a corresponding AD converter 37. The input port 35 is connected to a crank angle sensor 42 that generates an output pulse each time a crank shaft rotates, for example, 30 degrees. The output port 36 is connected to each of the ignition plug 26 and the cylinder fuel injection valve 27 via a corresponding one of drive circuits 38.

In the internal combustion engine A illustrated in FIG. 16, ignition timing control is executed, for example, in the following manner. When the ignition timing is advanced, the engine output is increased. However, when the ignition timing is advanced, knocking is more likely to occur. Thus, in the internal combustion engine A illustrated in FIG. 16, the ignition timing is advanced unless the occurrence of knocking is detected. Only when the occurrence of knocking is detected, the ignition timing is retarded. As a result, it is possible to maintain high engine output while reducing the occurrence of knocking.

In the internal combustion engine A illustrated in FIG. 16, the supercharger 23a is disposed in the intake passage 23, and thus the in-cylinder pressure is high, for example, even when the internal combustion engine A is operated at a low speed. This may cause large noise due to the operation of the piston 20. In the engine body 1 of the internal combustion engine A illustrated in FIG. 16, the occurrence of knocking is detected more accurately even in such a case.

Figure 17:
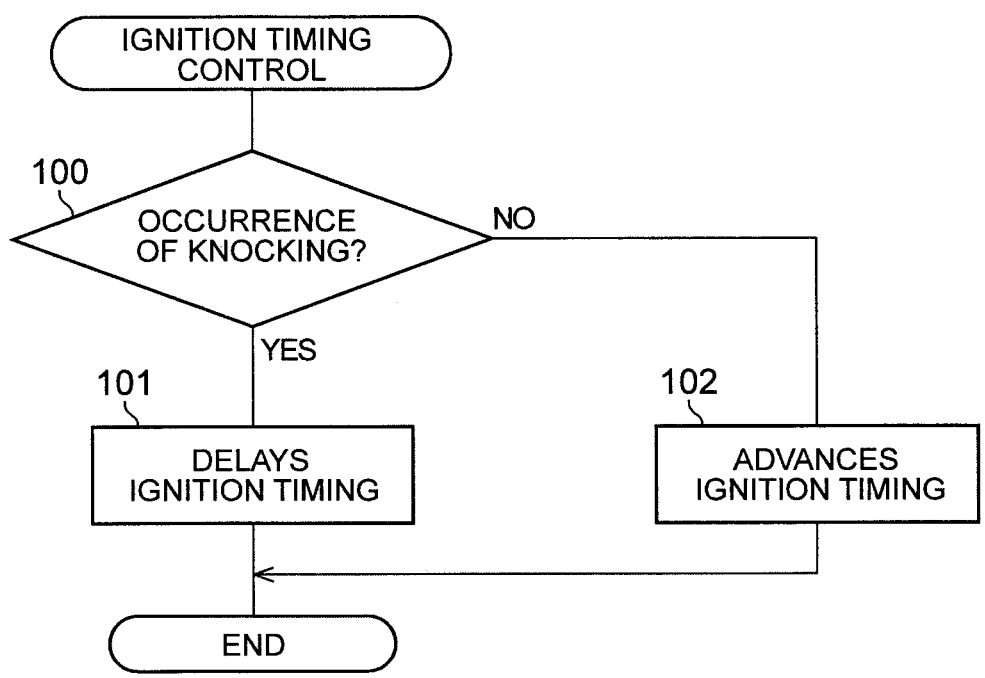
FIG. 17 is a flowchart of ignition timing control.

FIG. 17 illustrates a routine of the ignition timing control. The routine is executed as periodic interruptions. As illustrated in FIG. 17, in step 100, it is determined whether or not knocking has occurred based on output from the knock sensor 28. When it is determined that knocking has occurred, step 101 is executed to retard the ignition timing by a small prescribed amount. On the other hand, when it is determined that no knocking has occurred, step 102 is executed to advance the ignition timing by a small prescribed amount.

What is claimed is:

1. A cylinder injection internal combustion engine comprising
    an engine body including a cylinder block and a cylinder head, the cylinder head being fixed on a top surface of the cylinder block, and the engine body including a plurality of cylinders aligned along a longitudinal axis of the engine body, wherein:
    the cylinder head includes a cylinder head body, a plurality of fuel ports, a plurality of injection valve attachment bosses, and at least one projection;
    the fuel ports extend to the corresponding cylinders from a sidewall surface of the cylinder head body, the sidewall surface of the cylinder head body being located on one side of the longitudinal axis, on which intake ports are disposed;
    the injection valve attachment bosses project from the sidewall surface of the cylinder head body and surround openings of the corresponding fuel ports, and the injection valve attachment bosses are adapted to attach cylinder fuel injection valves to the respective fuel ports;
    the at least one projection projects from the sidewall surface of the cylinder head body, and the at least one projection is disposed adjacent to the corresponding injection valve attachment boss;
    the cylinder block includes a cylinder block body and a sensor attachment boss; and the sensor attachment boss projects from a sidewall surface of the cylinder block body, the sidewall surface of the cylinder block body being located on the one side of the longitudinal axis, on which the sidewall surface of the cylinder head body is located, and the sensor attachment boss is adapted to attach a knock sensor to the cylinder block, wherein,
    one of the at least one projection is disposed on one side of the adjacent injection valve attachment boss, on which the sensor attachment boss is disposed, and the one of the at least one projection is disposed on a straight line between the adjacent injection valve attachment boss and the sensor attachment boss.

2. The cylinder injection internal combustion engine according to claim 1, wherein:
    the cylinder head includes a plurality of the projections; and
    each of all the projections is located adjacent to the corresponding injection valve attachment boss, and all the projections project from the sidewall surface of the cylinder head body.

3. The cylinder injection internal combustion engine according to claim 1, wherein the projection is coupled to the adjacent injection valve attachment boss.

4. The cylinder injection internal combustion engine according to claim 1, wherein the projection is coupled to a lower deck of the cylinder head.

5. The cylinder injection internal combustion engine according to claim 1, wherein the projection is coupled to an outer wall surface of the corresponding intake port.

6. The cylinder injection internal combustion engine according to claim 1, wherein the cylinder block includes a single sensor attachment boss that is the sensor attachment boss.

7. The cylinder injection internal combustion engine according to claim 6, wherein the sensor attachment boss is disposed at substantially a center of the cylinder block in a direction of the longitudinal axis.

8. The cylinder injection internal combustion engine according to claim 1, wherein the projection includes a free end portion that is not coupled to any other portion of the cylinder head.

9. The cylinder injection internal combustion engine according to claim 1, wherein:
    the projection projects from the sidewall surface of the cylinder head body along a projection axis of the projection; and
    the projection is provided such that the projection axis of the projection extends to the corresponding cylinder without intersecting with the corresponding fuel port.

10. The cylinder injection internal combustion engine according to claim 1, wherein the projection has a columnar shape.

11. A cylinder injection internal combustion engine comprising
    an engine body including a cylinder block and a cylinder head, the cylinder head being fixed on a top surface of the cylinder block, and the engine body including a plurality of cylinders aligned along a longitudinal axis of the engine body, wherein:
    the cylinder head includes a cylinder head body, a plurality of fuel ports, a plurality of injection valve attachment bosses, and at least one coupling portion;
    the fuel ports extend to the corresponding cylinders from a sidewall surface of the cylinder head body, the sidewall surface of the cylinder head body being located on one side of the longitudinal axis, on which intake ports are disposed;
    the injection valve attachment bosses project from the sidewall surface of the cylinder head body and surround openings of the corresponding fuel ports, and the injection valve attachment bosses are adapted to attach cylinder fuel injection valves to the respective fuel ports;
    one of the at least one coupling portion projects from the sidewall surface of the cylinder head body, and the one of the at least one coupling portion couples the corresponding injection valve attachment boss to a lower deck of the cylinder head;

the cylinder block includes a cylinder block body and a sensor attachment boss; and the sensor attachment boss projects from a sidewall surface of the cylinder block body, the sidewall surface of the cylinder block body being located on the one side of the longitudinal axis, on which the sidewall surface of the cylinder head body is located, and the sensor attachment boss is adapted to attach a knock sensor to the cylinder block, wherein, the one of the at least one coupling portion is disposed on one side of the adjacent injection valve attachment boss, on which the sensor attachment boss is disposed, and the one of the at least one coupling portion is disposed on a straight line between the adjacent injection valve attachment boss and the sensor attachment boss.

12. The cylinder injection internal combustion engine according to claim 1, further comprising:

fuel injection valves attached to the respective injection valve attachment bosses, the fuel injection valves configured to inject fuel directly into the cylinders;

a knock sensor attached to the sensor attachment boss, the knock sensor configured to detect occurrence of knocking;

ignition plugs fitted in ignition plug receiving holes of the cylinder head;

a controller configured to control ignition timing, the controller being configured to control the ignition timing based on output from the knock sensor.

13. The cylinder injection internal combustion engine according to claim 11, further comprising:

fuel injection valves attached to the respective injection valve attachment bosses, the fuel injection valves configured to inject fuel directly into the cylinders;

a knock sensor attached to the sensor attachment boss, the knock sensor configured to detect occurrence of knocking;

ignition plugs fitted in ignition plug receiving holes of the cylinder head;

a controller configured to control ignition timing, the controller being configured to control the ignition timing based on output from the knock sensor.

* * * * *